TRANSISTOR MAJORITY LOGIC ADDER

Filed April 29, 1959 2 Sheets-Sheet 1

INVENTOR.
WINFIELD S. CURRY JR.,
BY Robert H. Himes
ATTORNEY

INVENTOR.
WINFIELD S. CURRY JR.,
BY Robert H. Himes
ATTORNEY.

United States Patent Office 2,999,637
Patented Sept. 12, 1961

2,999,637
TRANSISTOR MAJORITY LOGIC ADDER

Winfield S. Curry, Jr., Anaheim, Calif., assignor to Hughes Aircraft Company, Culver City, Calif., a corporation of Delaware
Filed Apr. 29, 1959, Ser. No. 809,750
2 Claims. (Cl. 235—175)

This invention relates to digital computing apparatus and, more particularly, to a binary adder composed principally of elements that are adapted to produce an informational level output signal in response to the concurrence of information level voltages at a majority of the input circuits thereto. An apparatus for producing an output signal of this type is designated as a "majority logic computer element."

Electronic digital computing apparatus consists primarily of electronic circuits capable of performing functions represented by logical equations. One of the simplest forms of computing apparatus for performing these functions is the diode gate. Diode gates, however, exhibit an inherent voltage attenuation which make their use less desirable. On the other hand, other devices such as the "Nor" circuit and the parametron offer advantages that make them more desirable than diode gates, in that they are capable of operating at faster speeds and require fewer components than are required by comparable diode gating elements. The parametron, however, uses primarily magnetic cores which require radically different types of supplementary circuits. Also, the carry propagation of the parametron is only one-tenth as fast as diode or "Nor" circuits.

It is an object of the present invention to provide an improved binary adder composed of majority logic computer elements.

It is another object of the present invention to provide a binary adder including majority logic computer elements which use substantially fewer elements than comparable diode gating or "Nor" elements.

A further object of the present invention is to provide a binary adder including majority logic computer elements capable of operating substantially faster than comparable elements employing magnetic cores.

A still further object of the present invention is to provide improved serial or parallel binary adder constituted of majority logic computer elements.

The above-mentioned and other features and objects of this invention and the manner of obtaining them will become more apparent by reference to the following description taken in conjunction with the accompanying drawings, wherein.

Figure 1:
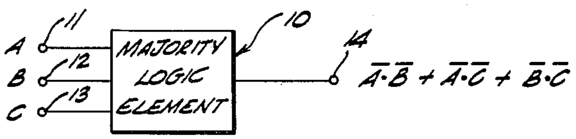
FIG. 1 is a block diagram showing the logic performed by a majority logic element of the present invention having three input terminals.

In the following description, bi-level signals representing binary numbers are designated A, B and C. In addition, the complements of each of these signals, i.e., the signals that are always of the opposite level during a particular bit interval are designated as $\overline{A}$, $\overline{B}$ and $\overline{C}$, respectively. Also, in circumstances where it is desired to indicate a bit representing a particular digit in time or space, appropriate subscripts wil be used: for example, $A_n$ will represent the *n*th bit of signal A for either serial or parallel signals. Also, signal $\overline{C}_{n-1}$ will represent the complement of the signal C for the bit immediately prior to the *n* bit for serial signals or, in the case of parallel signals, the complement of the signal C for the next less significant bit to the *n* bit. Referring now to the drawing, FIG. 1 illustrates a majority logic element 10 of the type employed in the present invention. Majority logic element 10 has input terminals 11, 12 and 13 and an output terminal 14. In cases where binary signals A, B and C are applied respectively to input terminals 11, 12 and 13, the majority logic element 10 produces the signal represented by the Boolean logic $$(\overline{A}\cdot\overline{B}+\overline{A}\cdot\overline{C}+\overline{B}\cdot\overline{C}) \quad (1)$$

at the output terminal 14.

Figure 2:
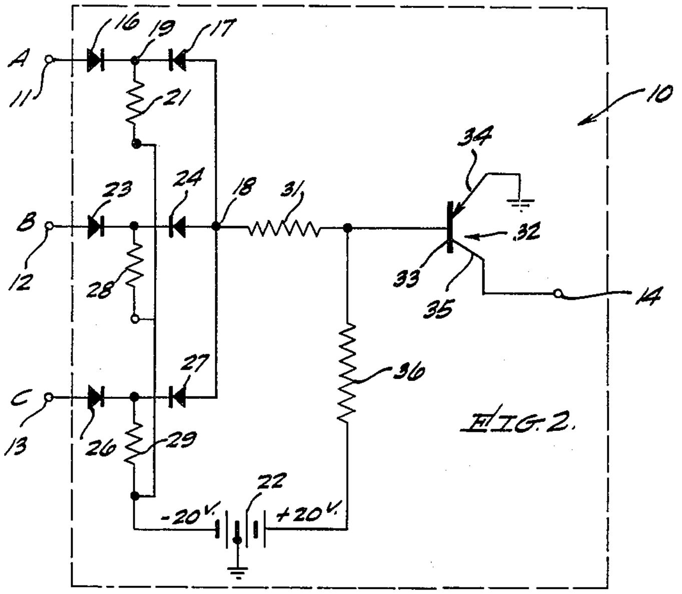
FIG. 2 shows a schematic circuit diagram of a preferred embodiment of the majority logic computer element shown in FIG. 1.

Referring now to FIG. 2, there is illustrated the schematic circuit diagram for the majority logic element 10 of FIG. 1. In particular, input terminal 11 is connected through diodes 16 and 17 to a common junction 18, the diodes 16, 17 being poled so as to allow current to flow towards a junction 19 located between the diodes 16, 17. The junction 19 is connected through a resistor 21 to the negative terminal of a battery 22, an intermediate terminal of which is connected to ground so as to provide potentials of the order of −20 and +20 volts with respect to ground on the negative and positive terminals thereof, respectively. In the present case, the ohmic value of resistor 21 is chosen to be of the order of 15,000 ohms. Also, with regard to the potentials provided by the battery 22, it is apparent that these will be determined by the ohmic values selected for resistors throughout the circuit.

Similarly, input terminal 12 is connected through diodes 23, 24 to common junction 18 and the input terminal 13 is connected through diodes 26, 27 to the common junction 18, the diodes 23, 24 and 26, 27 being poled in the same direction as the diodes 16, 17, respectively. In addition, a resistor 28 is connected from the junction between diodes 23, 24 to the negative terminal of the battery 22 and a resistor 29 is connected from the junction between diodes 26, 27 to the negative terminal of the battery 22. The ohmic value of the resistors 28, 29 is made equal to that of resistor 21 which in the present case is of the order of 15,000 ohms.

A resistor 31 is then connected from the common junction 18 to the base 33 of a p-n-p transistor 32, the emitter 34 of which is connected to ground and the collector 35 to the output terminal 14. Lastly, a resistor 36 is connected from the junction between resistor 31 and the base 33 of transistor 32 to the positive terminal of the battery 22, which terminal was previously specified to provide a direct-current voltage of the order of +20 volts with respect to ground. The ohmic values of the resistors 31, 36 are dependent upon the ohmic values of the resistors 21, 28 and 29 and in the instant case are 620 and 12,000 ohms, respectively.

In a majority logic computing element, the design is such that when a majority of the input signals are in one state, the output signal produced will be in the opposite state. For this reason it is always necessary that there be an odd number of input signals and, hence, an odd number of input terminals. In the instant case, the majority logic computing element 10 of FIGS. 1 and 2 has three input terminals 11, 12 and 13. Hence, in the operation of element 10, if any two of the three input signals A, B or C are high, i.e., at the information level, the transistor 32 will be biased to cutoff whereby the voltage level appearing at the output terminal 14 will be determined by the characteristics of the input circuit. Conversely, if any two of the three input signals A, B or C are low, the transistor 32 will conduct thereby to produce an information level at the output terminal.

Figure 5:
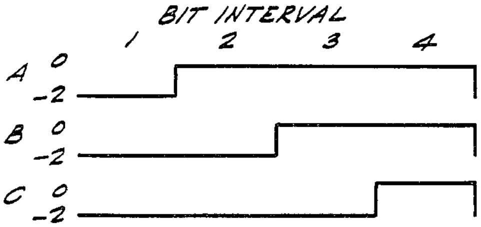
FIG. 5 illustrates explanatory waveforms of voltages available in the device of FIG. 2.

Referring now to FIG. 5, there is illustrated explanatory waveforms of the majority logic computer element 10 described in connection with FIG. 2. The bi-level signals employed can either assume any negative voltage level, which level when generated, is of the order of −2 bolts or 0 volt (ground potential), the 0 volt level usuall) being the information level of the signal and the negative voltage being the low level. Thus, the signals A, B and C are applied to the input signal terminals 11, 12 and 13, respectively. To illustrate the operation of the device, during the bit interval 1, all of the bi-level signals are low; during bit interval 2, signal A is at the information level and signals B and C are low; during bit interval 3, signals A and B are at the information level and signal C is low; and, lastly, during bit interval 4, all of the signals A, B and C are at the information level.

Referring now to FIG. 2, for current flow from the positive to the negative terminals of battery 22, it is evident that current will flow through resistors 36, 31 to the common junction 18. At this common junction 18, the current will divide, whereupon one-third will flow through diode 17 and resistor 21, a second one-third through diode 24 and resistor 28, and the final one-third through diode 27 and resistor 29. This being the case, the effective resistance presented by the resistors 21, 28, 29 will be one-third of the ohmic value of each resistor or 5,000 ohms. Thus, considering only the effect of the battery 22, the potentials assumed at the junctions between the diodes 16, 17; 23, 24; and 26, 27 would be −8 volts relative to ground. As previously mentioned, however, the low levels of the signals A, B and C applied to input terminals 11, 12 and 13 may either be "floating" or at −2 volts with respect to ground. It is evident that the potential level of the junctions between the pairs of diodes 16, 17; 23, 24; 26, 27 in the first case will not be changed and in the latter case will be substantially equal to the −2 volt level of the input signals A, B and C, since diodes 16, 23 and 26 are poled so as to allow current to flow from the respective input terminals 11, 12 and 13.

As mentioned above, during bit interval 1, FIG. 5, all of the input signals A, B and C are at the lower level. For purposes of explanation, it will be assumed that voltages of the order of −2 volts relative to ground are applied to each of the input terminals 11, 12 and 13. Thus a voltage equal to 22 volts will divide across the resistors 36, 31 and the diodes 17, 24, 27 with the result that the base 33 of transistor 32 is maintained at −0.8 volt relative to ground. Since the voltage applied to the base 33 is negative with respect to that of the emitter 34, current will flow thereby the produce a voltage level of the order of 0 volt at the output terminal 14.

During bit interval 2, the signal A applied to terminal 11 is at the information level, i.e., 0 volt, and the signals B and C applied respectively to input terminals 12, 13 will be assumed to be at a level of −2 volts relative to ground. This being the case, it is apparent that all of the current flowing through resistors 36, 31 will divide and flow through diode 24 in series with resistor 28 and diode 27 in series wtih resistor 29. Thus, resistors 28 and 29 will now be in parallel whereby they present a resistance of 7,500 ohms in the overall voltage dividing network. Under these circumstances, a voltage of −5.2 volts would tend to appear at the junctions between the diodes 23, 24 and 26, 27. Since the aforementioned voltage is still negative relative to the voltage level of the input signals, the voltage level of the input signals will still control the potential at the junction between diodes 23, 24 and 26, 27. That is, the voltage levels at these junctions will remain at −2 volts with respect to ground. This being the case, the voltage applied to the base 33 of transistor 32 will remain at −0.8 volt with respect to ground. Hence, there will be no change in the voltage level of the output signal during bit interval 2.

During bit interval 3, the signals A and B applied to input terminals 11 and 12 are at the information level; that is, they are maintained at 0 volt with respect to ground and signal C applied to input terminal 13 remains at the −2 volts with respect to ground. Under these circumstances, all of the current flow through resistors 36, 31 will tend to flow through diode 27 and series resistor 29 provided that the common junction 18 remains at a potential that is negative relative to ground. In the instant case, however, the voltage which would appear at the junction between the diodes 26, 27, due only to the effect of battery 22 would be +1.6 volts relative to ground. Thus, because of the direction in which the diode 26 is poled, the battery 22 will maintain the potential at the junction between diodes 26 and 27 sufficiently positive so that signal C can no longer control the potential thereat. As soon as common junction 18 tends to go positive relative to ground, however, it is apparent that once again current can flow through all of the diodes 17, 24 and 27. Hence, the potential of common junction 18 will remain substantially at 0 volt relative to ground. Under these circumstances, the voltage applied to base 33 of transistor 32 will be +1.1 volts relative to ground, and under which condition the transistor 32 will be biased to cutoff whereby the output terminal 14 is isolated or left "floating," in which case its potential level will be determined by the characteristics of the circuit to which it is connected. It is evident that where the input terminals 11, 12, 13 are connected to circuits of this type that potentials more negative than the −2 volts relative to ground potential would appear at the junctions between the diodes 16, 17; 23, 24; and 26, 27 whereby the above-described mode of operation would remain unchanged. Lastly, with regard to bit interval 4 (FIG. 5), the application of an information level signal to input terminal 13 (the other signals being the same as during bit interval 3) will have no effect on the operation as the junction between diodes 26, 27 is already substantially at ground potential. In addition, if it is desired to employ a n-p-n type transistor for the transistor 32 rather than the p-n-p type previously specified, this may be readily accomplished by reversing the polarity of the connections to battery 22 and the directions in which the diodes 16, 17, 23, 24, and 26 and 27 are poled.

Figure 3:
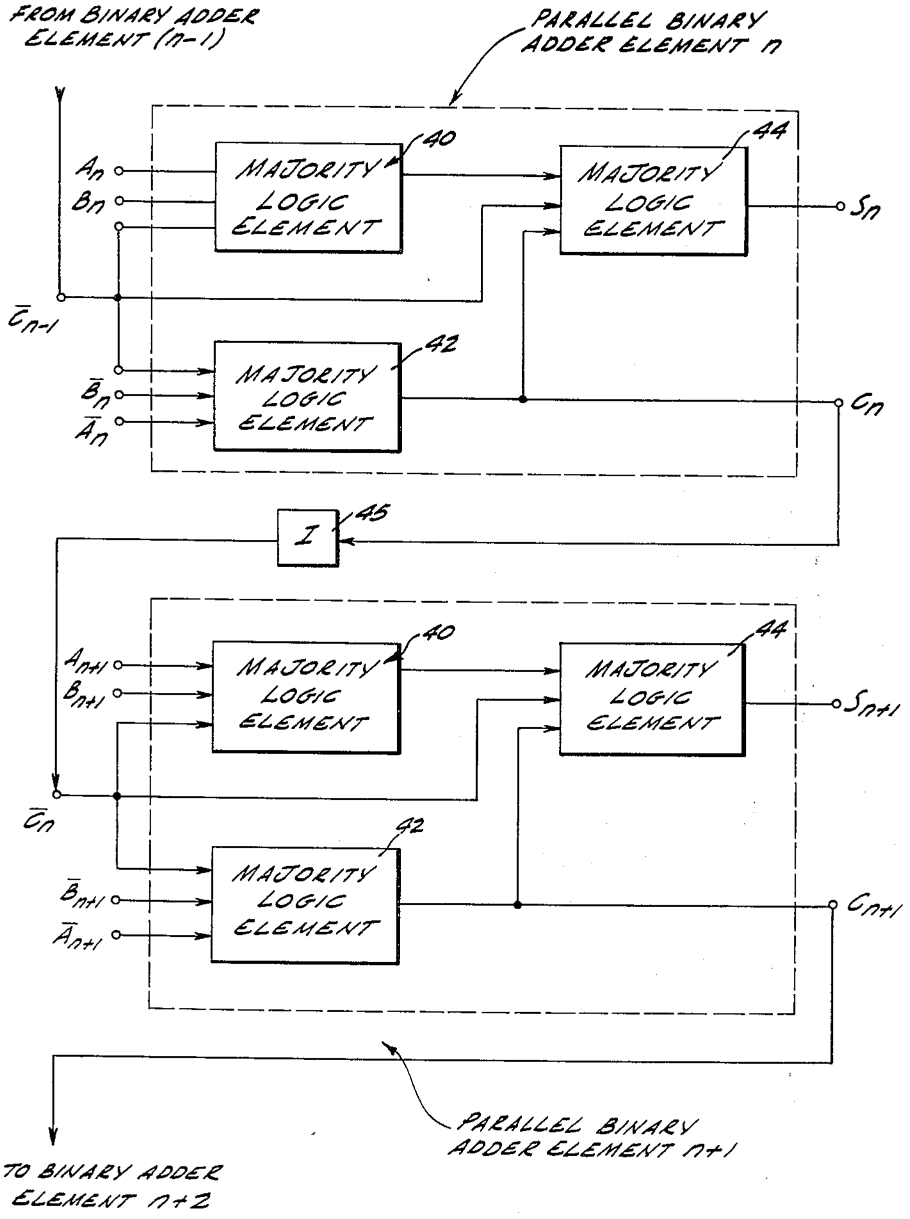
FIG. 3 illustrates two elements of parallel binary adder composed of majority logic computer elements of the type shown in FIG. 1.

Referring now to FIG. 3, there are shown parallel binary adder elements $n$ and $(n+1)$ of a parallel adder composed of majority logic computer elements of the type described in connection with FIG. 2. Parallel binary adder element $n$ includes a first majority logic computer element 40 that is made responsive to binary signals $A_n$, $B_n$ and $\overline{C}_{n-1}$ where increasing values of $n$ represent bit spaces of increasing orders of significance. A second majority logic computer element 42 is made responsive to binary signals $\overline{A}_n$, $\overline{B}_n$ and $\overline{C}_{n-1}$ and a third majority logic computer element 44 accepts signals from the outputs of computer elements 40, 42 and binary signal $\overline{C}_{n-1}$. With this arrangement, majority logic computer element 44 produces a binary signal representative of the $n$th digit of the sum of the binary numbers A and B and majority logic computer element 42 produces a signal representative of the carry digit from the $n$th digit of the sum, i.e., $C_n$. In generating a binary signal representative of the entire sum, the carry digit $C_{n-1}$ is added with the digits $A_n$ and $B_n$ to produce the $n$th digit of the sum where $n$ commences with one and increases to one greater than the number of digits in the largest number being added. In order to provide a carry input for the binary adder element $(n+1)$, it is necessary to invert the output of majority logic element 44 by means of an inverter 45 thereby to provide a signal representative of $\overline{C}_n$. In other respects, the binary adder element is connected in the same manner as parallel binary adder element $n$.

Figure 4:
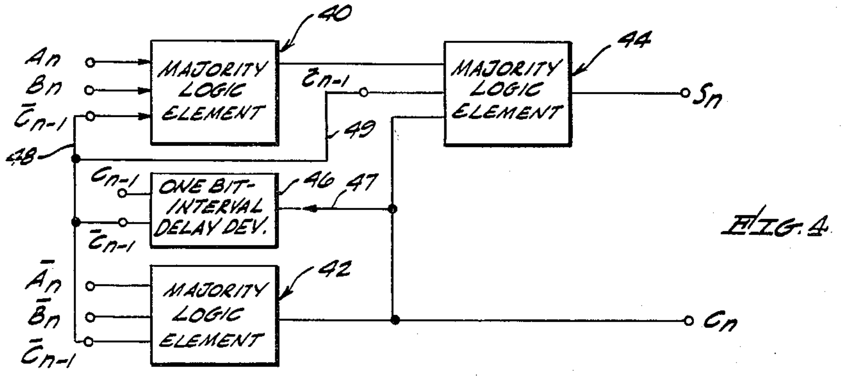
FIG. 4 illustrates a serial binary adder composed of majority logic computer elements of the type shown in FIG. 1.

Referring now to FIG. 4, there is shown a serial adder wherein the subscript $n$ is used to refer to bit intervals in time commencing with the least significant bit or binary digit, whereas, in the case of the parallel, $n$ referred to bit intervals in space commencing with the least significant digit. Since the binary signal $\overline{C}_{n-1}$ required as an input signal represents a signal delayed one bit interval in time, it is necessary to employ a one bit interval delay device 46 to convert a parallel adder element of FIG. 3 into a serial adder. In this case, the binary signal $C_n$ available at the output of computer element 42 is applied over a lead indicated by a line 47 to the input of delay device 46, which device produces signals representative of both the principal and complement of the carry signal for the previous bit interval, i.e., signals $C_{n-1}$ and $\overline{C}_{n-1}$. As before, binary signal $\overline{C}_{n-1}$ is applied over a lead represented by a dashed line 48 to an input terminal of majority logic computer element 40 and over a lead represented by a dashed line 49 to the input of majority computer element 44. With the one bit interval delay device 46 employed and connected as described, it can be shown from Boolean function (1) that the majority logic computer element 44 produces an output signal having successive bit intervals representative of the sum of binary signals A and B commencing with the least significant digits thereof.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. In a parallel adder circuit, an apparatus for adding the $n$th digit of first and second binary numbers wherein $n$ is a positive integer greater than zero which commences with 1 and assumes progressively increasing values for increasing orders of significance of the digits of said binary numbers, said apparatus comprising a first majority logic computer element having first, second and third input terminals and an output terminal, said first and second input terminals being responsive, respectively, to first and second signals representative of the $n$th digit of each of said first and second binary numbers and said third input terminal being responsive to a third signal that is the complement of the carry signal produced by the addition of the $(n-1)$ digits of said first and second binary numbers and the carry from the $(n-2)$ order; a second majority logic computer element having a first, second and third input terminal and an output terminal, said first and second input terminals being responsive, respectively, to fourth and fifth signals representative of the complements of signals representing the $n$th digit of said first and second binary numbers and said third input terminal being responsive to said third signal thereby to produce a sixth signal at said output terminal thereof representative of the carry digit from the addition of the $n$th digits of said first and second binary numbers and the carry from the $(n-1)$ order at said output terminal thereof; and a third majority logic computer element having first, second and third input terminals and an output terminal, said first and second input terminals being connected, respectively, to the output terminals of said first and second majority logic computer elements and said third input terminal being responsive to said third signal thereby to produce at the output terminal thereof a signal representative of the sum of the $n$th digits of said first and second binary numbers and the carry from the $(n-1)$ order.

2. A serial adder apparatus for adding first and second signals representative respectively of first and second binary numbers, said apparatus comprising a first majority logic computer element having first, second and third inputs and an output, said first and second inputs being responsive respectively to said first and second signals; a second majority logic computer element having first, second and third inputs and an output, said first and second inputs being responsive, respectively, to third and fourth signals which are complementary, respectively, to said first and second signals; a one bit interval delay device having an input connected to the output of said second majority logic computer element for inverting and delaying the signal applied thereto for one bit interval corresponding to one digit of said binary numbers; means for connecting the output of said one bit interval delay device to said third inputs of said first and second majority logic computer elements whereby said second majority logic computer element produces a signal representative of the carry digits from the successive additions of corresponding digits of said first and second binary numbers and the carry from the order immediately prior thereto; and a third majority logic computer element having first, second and third inputs and an output, said first, second and third inputs being connected to the outputs of said first and second majority logic computer elements and said one bit interval delay device thereby to produce a binary signal at the output thereof representative of successive sums of corresponding individual digits of said first and second binary numbers and the carry from the order immediately prior thereto.

References Cited in the file of this patent

UNITED STATES PATENTS

| | | |
|---|---|---|
| 2,603,746 | Burkhart et al. | July 15, 1952 |
| 2,784,312 | Kates | Mar. 5, 1957 |
| 2,869,786 | Jacobsohn | Jan. 20, 1959 |
| 2,895,673 | Williams | July 21, 1959 |
| 2,943,260 | Barnard | June 28, 1960 |

OTHER REFERENCES

Hartree: Calculating Instruments and Machines, University of Illinois Press, Urbana, 1949, page 104.

Wilkes: Automatic Digital Computers, John Wiley & Sons, Inc., New York, 1956, page 235.

Pressman: Design of Transistorized Circuits for Digital Computers, John F. Rider Publisher, Inc., New York, page 202, March 1959.